United States Patent Office.

S. LLOYD WIEGAND, OF PHILADELPHIA, PENNSYLVANIA.

*Letters Patent No. 62,583, dated March 5, 1867.*

---

IMPROVEMENT IN OBTAINING OIL FROM PARAFFINE, &c.

---

*The Schedule referred to in these Letters Patent and making part of the same.*

---

TO ALL WHOM IT MAY CONCERN:

Be it known that I, S. LLOYD WIEGAND, of the city and county of Philadelphia, and State of Pennsylvania, have invented a certain new and useful Process of Extracting Oil and Paraffine from Bituminous Substances; and I do hereby declare that the following is a full, clear, and exact description thereof.

The nature of my invention consists in exposing bituminous substances or other matter capable of yielding hydrocarbon oils or paraffine, in a close vessel or chamber, at a temperature below that requisite to decompose the oily or hydrocarbon vapors into permanent gas, to the action of the gaseous products resulting from the decomposition of steam, by passing it through carbon heated to incandescence, and subsequently extracting the oil and paraffine therefrom, either by pressure or by displacement, by which means I am enabled to separate the oils and paraffine from the crude material at a lower temperature than by any other previously known process, and to obtain both a better quality and better yield of products.

I will now proceed to describe more fully and particularly the mode in which I conduct this process, so as to enable any experienced oil distiller to perform this operation.

I pass a very small jet of steam from a boiler under a pressure of about one hundred pounds per square inch (although steam of a lower pressure may be used) into the upper end of a vertical cylindric retort of about ten feet in length and ten inches internal diameter, charged with carbon, oak charcoal being the most eligible form, and heated to a bright red heat. From the lower portion of this retort by means of a tube, I conduct the gases evolved by the action of the carbon upon the steam into a second retort, which it is most convenient to have horizontal and flat-bottomed, heated to a temperature below that at which gas is generated, containing a charge of the mineral or other hydrocarbon-yielding material, and allow the gases to become absorbed by the material. After this action has continued a sufficient time, I either extract the fluid or dense vaporous matter contained in the charge by pressure, or by introducing a current or currents of steam or aqueous vapor, (very low-pressure steam surcharged with water in some instances having produced most satisfactory results,) displace and carry off the oily matter and paraffine in the charge to a suitable receiving and cooling vessel or vessels. In conducting the process hereinbefore recited, I do not wish to be understood as restricting myself to any particular form of apparatus, but regard as my invention the mode or process employed of first generating the oil at low temperature, and afterwards separating in the mode or modes described. I am aware that distillations of paraffine and oil from coals have been conducted where currents of superheated steam were circulated through the charge, both in retorts heated externally and by the steam only, and the vapors carried off to a condenser, and have already patented, myself, a process wherein currents of the gases generated in the mode hereinbefore recited were used to carry off the condensable hydrocarbon vapors, both of which I distinctly disclaim as any part of this present invention; but what I do claim herein as my invention, and desire to secure as such by Letters Patent, is—

The process of treating bituminous substances by means of the gases as hereinbefore described, or in any equivalent manner, and subsequently extracting the oil and paraffine by pressure or displacement in the manner hereinbefore set forth and described, irrespective of the particular form of the apparatus in which the operation may be conducted.

S. LLOYD WIEGAND.

Witnesses:
W. P. THOMPSON,
ROBT. P. THOMPSON.